March 31, 1970 G. McHENRY 3,504,189
SEQUENCE TIMING CIRCUIT
Original Filed Dec. 5, 1966
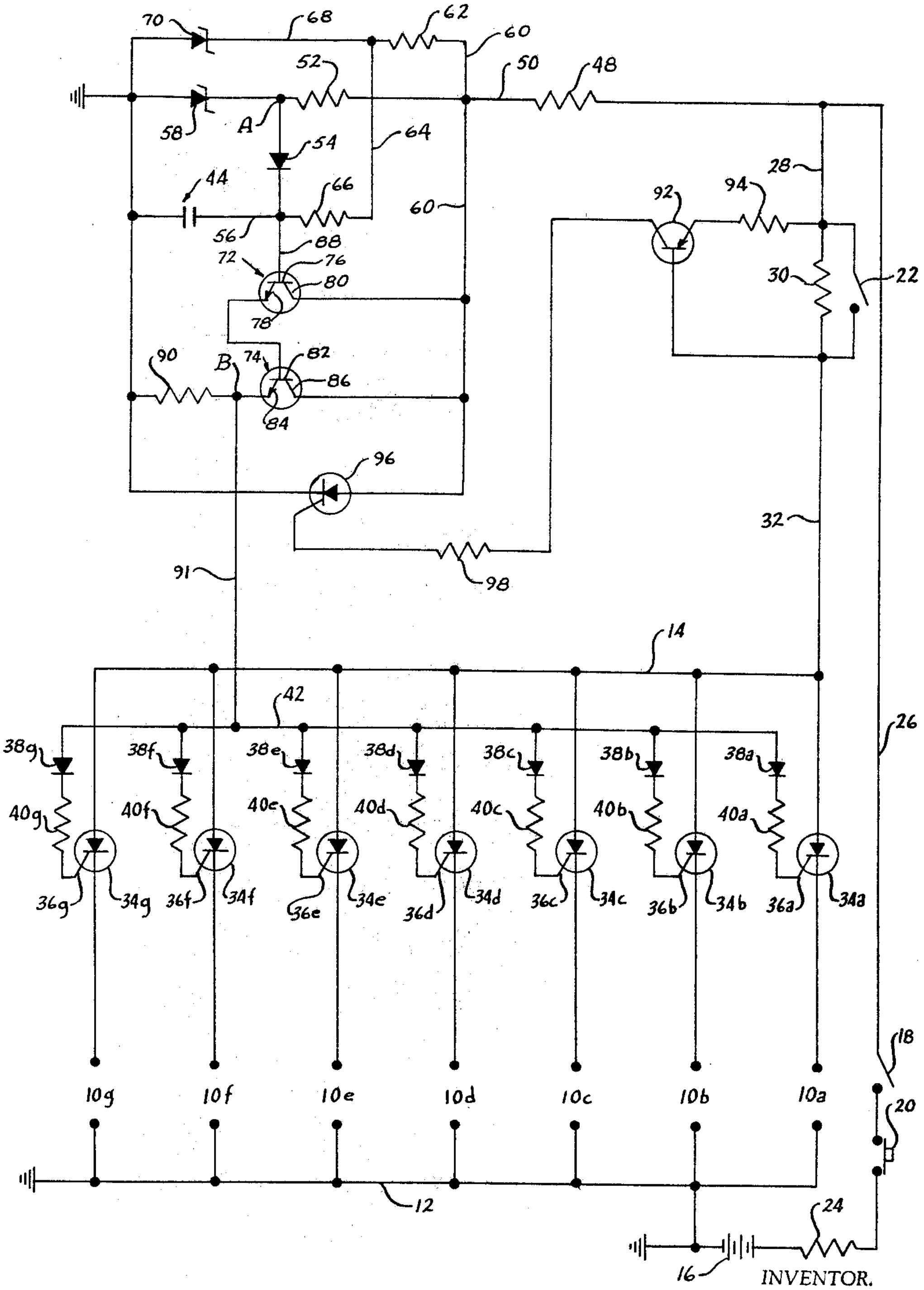
INVENTOR.
GARL McHENRY
BY Dybvig and Dybvig
HIS ATTORNEYS

United States Patent Office 3,504,189

Patented Mar. 31, 1970

3,504,189

SEQUENCE TIMING CIRCUIT

Garl McHenry, New Carlisle, Ohio, assignor to Ledex, Inc., Dayton, Ohio, a corporation of Ohio Continuation of application Ser. No. 599,259, Dec. 5, 1966. This application Nov. 13, 1968, Ser. No. 776,856

Int. Cl. H03k *17/00*

U.S. Cl. 307—41 14 Claims

ABSTRACT OF THE DISCLOSURE

Apparatus for sequentially activating a plurality of loads comprises a plurality of switchable devices each having an output circuit switchable from a nonconductive to a conductive state, circuitry to connect the output circuit of each switchable device in series with a source of voltage and a corresponding one of said loads, a control circuit for each said switchable device, means to produce a control voltage which increases in magnitude with time and which is applied to all of said control circuits, each of said control circuits switching its switchable device to a conductive state at a different magnitude of said control voltage whereby said loads are sequentially energized by said source of voltage as the magnitude of said control voltage increases.

This is a continuation of application Ser. No. 599,259, filed Dec. 5, 1966, now abandoned.

This invention relates to a sequence timing circuit and, more particularly, to an electronic circuit for successively energizing load devices at preset voltage levels reached by an increasing voltage ramp.

It has been a common practice to use an RC circuit to establish an increasing voltage ramp, that is, a voltage value which increases at a predictable rate with the passage of time. Typical applications involve the firing of a bistable device such as a thyratron, a controlled rectifier or a unijunction transistor when the capacitor in the RC circuit is charged to a given voltage level and thus a predetermined period of time has passed. Such circuits are frequently used to interpose a measured time delay between the occurrence of two successive events. However, where a measured time delay is to be established between more than two successive events, the application of RC circuits becomes quite complex. Thus, it becomes necessary to employ plural capacitors, one for each additional event to be timed, or to employ a suitable transfer mechanism which will enable the same capacitor to be recharged for the timing of successive events.

By means of the present invention, this complexity in RC timing circuits is overcome by employing a single capacitor charging circuit to establish a voltage ramp which may be applied to a large number of bistable devices, each operating at a different voltage level, and so designing the circuit that the bistable devices may be successively operated at predetermined time intervals without drawing appreciable current from the capacitor and thus without disturbing the continued generation of the voltage ramp.

One object of the present invention is to provide an improved sequence timing circuit.

Another object of the present invention is to provide a single capacitor timing circuit effective to energize a succession of load devices during the course of one charging cycle of the capacitor.

Another object of the present invention is to provide a sequence timing circuit having no moving parts.

Still another object of the present invention is to provide a single capacitor sequence timing circuit including means to accelerate charging of the timing capacitor to an operating voltage range.

A further object of the present invention is to provide an improved sequence timing circuit having incorporated therein an override mechanism which enables independent operator control of the timing sequence.

Other objects and advantages reside in the construction of parts and combination thereof, the method of manufacture and the mode of operation as will become more apparent from the following description.

In the drawing, the single figure is a schematic wiring diagram of the timing circuit of the present invention.

Illustrated in the circuit are load terminal pairs 10*a*, 10*b*, 10*c*, 10*d*, 10*e*, 10*f* and 10*g*. These terminal pairs represent connections for load devices which are to be sequentially energized under the control of the present circuit. No particular load device has been shown between any of the terminal pairs for the reason that the present circuit may be used to control the sequential operation of any number of various types of loads. As examples, the loads may be simple display devices such as lamps, or they may comprise logic or readout circuits or they may comprise detonators for explosive devices which are to be successively fired by the disclosed circuit.

One terminal of each of the terminal pairs 10*a* through 10*g* is connected to ground through a common ground line 12. The opposite terminal of each of the terminal pairs 10ª through 10*g* is connected through the output circuit of a bistable device to a common power or voltage input line 14.

The voltage on the line 14 is supplied from a suitable source of direct current voltage 16 which may be a battery. However, before source voltage can appear on the line 14, switches 18 and 20 must be closed. Switch 18 is a safety switch, which must be closed before any part of the circuit can operate. Switch 20 is a push button control switch, which places the circuit operation under the manual control of an operator.

With switch 18 closed and switch 20 manually depressed, the voltage from the source 16 is supplied to the line 14 through a resistance 24, the switches 18 and 20, conductors 26 and 28, resistance 30 and conductor 32. As will be more fully described in the following, a bistable switch 22 is provided across resistor 30 so that, depending on the mode of circuit operation desired, the resistance 30 may be shunted out of the circuit.

In the preferred practice of the present invention invention, the bistable devices controlling application of voltage from the line 14 to the load terminals 10*a* through 10*g* are controlled rectifiers 34*a* through 34*g*, there being one controlled rectifier for each load terminal pair. The controlled rectifiers 34*a* through 34*g* each have an anode to cathode output circuit and a control electrode controlling the conductivity through said output circuit, the control electrodes for the rectifiers 34*a* through 34*g* being identified by the reference characters 36*a*, 36*b*, 36*c*, 36*d*, 36*e*, 36*f* and 36*g*.

Connected in series with each control electrode 34*a* through 34*g* is a control circuit including a unidirectional or one-way conducting diode and a series resistor. The several diodes are designated by the reference characters 38*a* through 38*g*. The series resistors are designated by the reference characters 40*a* through 40*g*. The anodes of the several diodes 38*a* through 38*g* are connected in common to a voltage input conductor 42 by means of which the output circuits of the controlled rectifiers may be switched from a nonconductive to a conductive state.

Each of the control circuits for the controlled rectifiers is adjusted to function at a different voltage level. This operating characteristic is conveniently obtained by selecting controlled rectifiers, all of which are triggered by substantially the same voltage at the control electrode and providing resistances 40*a* through 40*g*, all of which have a different resistance value. Due to the use of a different resistance value in the control circuit of each rectifier, the minimum voltage input to the rectifier control circuit to trigger each rectifier to conductivity is different for each rectifier.

A voltage ramp suitable for operating the several control circuits of the several rectifiers is generated on conductor 42 by means of an RC circuit, which includes the capacitor 44. The capacitor 44 has two charging circuits, one which regulates the rate of voltage increase in a voltage range effective to trigger the several rectifiers 34*a* through 34*g* through their respective control circuits and the other being effective to shorten the time in which the capacitor 44 reaches the triggering voltage range. For convenience, the first described charging circuit will be called the slow charge circuit and the second described charging circuit will be called the accelerated charge circuit.

In the accelerated charge circuit the capacitor 44 receives voltage from the source 16 through conductor 26, resistor 48, conductor 50, resistor 52, unidirectional diode 54 and conductor 56. This circuit connects to ground through Zener diode 58 at the point designated by the reference character A, where the resistor 52 connects to the diode 54. The Zener diode 58 is selected to become conductive at a voltage level near the lowest voltage effective to control any of the controlled rectifiers 34*a* through 34*g*. The capacitor 44 can thus be charged quickly through the resistor 52 to a voltage level at or near the firing range for the controlled rectifiers 34*a* through 34*g*; but when the charge of the capacitor 44 reaches that range, the Zener diode 58 becomes conductive so as to prevent a further voltage increase at the point A. The result is that when the accelerated charging circuit has reached the Zener point of the diode 58, this circuit becomes ineffective to further increase voltage on the capacitor 44.

The slow charging circuit for the capacitor 44 charges that capacitor from the voltage source 16 through the line 26 through the resistor 48, conductor 60, resistor 62, conductor 64, resistor 66 and conductor 56. It will be noted that this charging circuit is substantially the same as the accelerated charging circuit, except that the charging resistor 52 and the diode 54 in the accelerated charging circuit are in parallel with resistors 62 and 66 represent a charging resistance substantially larger in magnitude than the value of the resistor 52. Thus, as the capacitor 44 is initially charged with the accelerated charge circuit, current through the charging resistors 62 and 66 makes only a nominal contribution to the charge built up on capacitor 44. However, when the Zener point of the diode 58 has been reached, the charging path through the resistors 62 and 66 becomes the only path by which the charge on the capacitor 44 can be increased and, accordingly, the increase in voltage on the capacitor 44 proceeds at a correspondingly lower rate. It will be noted that the diode 54 permits this continued charging of the capacitor 44 by blocking discharge of that capacitor to the Zener diode 58.

In order to insure that the slow charging of the capacitor 44 proceeds at an accurately controlled and predictable rate, Zener diode 70 is connected between ground and the resistor 62 through conductor 68. Zener diode 70 has a Zener point which is higher than the highest voltage required to trigger any of the controlled rectifiers 34*a* through 34*g*; but less than the rated voltage of the source 16. Preferably, Zener diode 70 is always exposed to a voltage greater than its Zener point, so that the voltage applied to the resistance 66 remains substantially constant at the Zener point for diode 70.

The voltage developed on the capacitor 44 is applied to the line 42 with the aid of transistors 72 and 74 which are connected as current amplifiers. Transistor 72 has a base 76, an emitter 78 and a collector 80. Transistor 74 has a base 82, an emitter 84 and a collector 86.

Emitter 78 of transistor 72 is connected to base 82 of transistor 74 and emitter 84 of transistor 74 connects to ground through resistor 90. The voltage on the resistance 90 is applied to conductor 42 through conductor 91.

With the transistors 72 and 74 connected as described, the voltage at the point B (emitter of the transistor 74) follows the voltage on the capacitor 44 but with negligible current drain from the capacitor. Thus, as the capacitor 44 charges to successively higher voltage levels, a minute current through the conductor 88, through the base 76 of the transistor 72 to the emitter 78 thereof permits an amplified current to flow between the collector 80 of transistor 72, the emitter 78 of transistor 72, and the base 82 of the transistor 74. This amplified current is further amplified by the transistor 74. The result is that the current flow in the collector to emitter circuit of the transistor 74 is always more than adequate to maintain a voltage drop across resistor 90 which substantially balances the voltage on the capacitor 44.

In practical effect, the transistors 72 and 74 perform an impedance matching function, the transistors supplying a high forward impedance between the capacitor 44 and the conductor 42. This enables sufficient current to be supplied to the conductor 42 for operation of the various controlled rectifiers 34*a* to 34*g* with negligible current drain from the capacitor 44.

In view of the foregoing description, it can be seen that the capacitor 44 may be charged during the slow charge portion of its charging cycle to successively higher voltages which are effective to successfully operate the controlled rectifiers 34*a* through 34*g* without the successive triggering of the controlled rectifiers interfering with an orderly rise of the voltage on the capacitor 44.

In one mode of operation of the foregoing circuit, the switch 22 is closed to shunt the resistor 30. When the safety switch 18 has been closed and operator has depressed push button switch 20, capacitor 44 first receives an accelerated charge through resistor 52 then a slower charge through resistor 66. During the period of slow charge, the controlled rectifiers 34*a* through 34*g* are successively fired, the order in which the controlled rectifiers fire being determined by the resistance values in their respective control circuits. The successive firing of the controlled rectifiers 34*a* through 34*g* results, in turn, in a successive firing of the loads, whatever they may be, which are connected across the various terminal pairs 10*a* through 10*g*. This mode of operation can be referred to as a ripple firing mode, in that an operator with a single closure of the push button switch 20 may cause all loads across the load terminals 10*a* through 10*g* to operate on an automatic sequence determined by the charging rate on a capacitor 44 and the resistance values in the control circuits of the controlled rectifiers.

For some applications of the present circuit, it is desired that, in addition to the ripple firing mode described, the circuit be convertible to a single fire mode independently timed by the operator. To achieve this single fire mode, the switch 22 shunting the resistor 30 is opened with the result that each time one of the loads across the terminals 10*a* through 10*g* is fired, a voltage drop appears across the resistor 30. This voltage drop is applied across the base to emitter circuit of transistor 92 through resistor 94. Whenever a voltage drop appears across resistor 30, a current flow in the base to emitter section of transistor 92 permits a current flow in the emitter to collector section of transistor 92 through resistor 94. This current flow is caused to trigger a controlled rectifier 96 through resistor 98. When the controlled rectifier 96 has been triggered, the cathode-anode output circuit of that rectifier effectively grounds the capacitor charging circuit at the conductor 60. Accordingly, the capacitor 44 ceases to charge.

In this mode of operation, then, an initial closure of the push button switch 20 will permit the capacitor 44 to charge through its accelerated charge circuit and possibly through an initial portion of its controlled charge circuit until the controlled rectifier 34*a* through 34*g* having the lowest triggering potential fires. As soon as that controlled rectifier fires, a voltage appears across resistor 30 and, due to the operation of the controlled rectifier 96, further charging of the capacitor 44 ceases and the capacitor 44 discharges through resistors 62 and 66 and rectifier 96. The controlled rectifier 34*a* through 34*g* which operates at the next higher voltage level cannot be fired until the controlled rectifier 96 has been cut off and this cannot occur until substantially all voltage has been removed from the conductor 60. This does not occur until the push button 20 has been released. Accordingly, when the push button 20 has been pressed, one and only one of the controlled rectifiers 34*a* through 34*g* can fire, this being the controlled rectifier which fires at the lowest voltage level. The controlled rectifier which operates at the next higher voltage level cannot be fired until the load is removed from the previously fired controlled rectifier, such as by rocket launching or the like, and the push button 20 has been released and then again depressed, whereupon charging of the capacitor 44 can proceed to the next highest level where another of the controlled rectifiers 34*a* through 34*g* will be fired.

From the foregoing, it is clear that in the single fire mode wherein the switch 22 is open, one and only one of the loads associated with the controlled rectifiers 34*a* through 34*g* can be fired with each depression of the push button switch 20. Thus, the rate at which the load devices are energized with the single fire circuit is placed entirely within the control of the operator.

From the foregoing description it will be seen that the circuit of the present invention provides two modes of operation, one in which a plurality of loads may be successively fired at controlled time intervals determined by the rate of charge development on the capacitor 44 and another in which a plurality of load devices may be energized in a predetermined sequence controlled by the circuit perimeters but at time intervals exclusively within the control of the operator.

Those skilled in the art will quickly recognize that the foregoing circuit has numerous practical applications. One example is in the firing of rockets as from an aircraft. In the ripple fire mode, the circuit may control the firing of a predetermined number of rockets in a predetermined sequence and at predetermined time intervals. Alternatively, the pilot may, by opening the switch 22, fire the rockets one at a time in a time sequence which is entirely under his control. In a different type of application, the load devices may comprise display lamps and may be used to measure the time lapse between the closing and opening of the switch 20, the display lamps giving an immediate read out of the time interval. For this type of application, the accelerated charge circuit may be adjusted to a charging interval equal to the intervals between successive firings of the rectifiers 34*a* through 34*g* produced by the slow charge circuit. In still another application, the resistance 90 may be replaced by a source of unknown voltage, the magnitude of the unknown voltage being indicated on a digital basis by the number of controlled rectifiers 34*a* through *g* which have been triggered. Such digital indication is conveniently obtained by using display lamps as load devices connected across the terminal pairs 10*a* through 10*g*.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

I claim:

1. Apparatus for sequentially activating a plurality of load devices comprising: a plurality of bistable devices each having an output circuit and a voltage responsive control electrode, a source of potential, circuitry to connect the output circuit of each bistable device in series with said source and a corresponding one of said load devices, there being one bistable device for each load device, a plurality of control circuits, there being one control circuit for each bistable device connected at one end to the control electrode for said each bistable device, each said control circuit including a first resistive component establishing the magnitude of voltage required to trigger said bistable device to a conductive state, said voltage magnitude being different for each said control circuit, first means connecting the other ends of said control circuits in common, second means connected in series with said source to produce a control voltage which increases in magnitude with time, and third means connected between said second means and said first means to apply said control voltage to said first means.

2. The apparatus of claim 1, wherein each said control circuit includes a one-way conductive means permitting current flow to the control electrode connected to said each control circuit and opposing current flow from said control electrode through said first means to any other of said control circuits.

3. The apparatus of claim 1, wherein said second means includes a first circuit having a second resistive component and a capacitative component, said third means connecting one end of said capacitative component to said first means.

4. The apparatus of claim 3, wherein said second means includes a second circuit connected in parallel to at least a portion of said second resistive component, said second circuit having a third resistive component of magnitude less than the magnitude of the portion of said second resistive component which is in parallel to said second circuit, said second circuit having a second one-way conductive means connecting one end of said third resistive component to said one end of said capacitative component, and wherein said apparatus includes voltage limiting means connected between said one end of said third resistive component and the other end of said capacitative component, said second one-way conductive means opposing discharge of said capacitative component through said voltage limiting means.

5. The apparatus of claim 4, wherein said voltage limiting means limits the voltage at said one end of said third resistive means to a magnitude not substantially greater than the lowest magnitude of voltage required to trigger any of said bistable devices.

6. The apparatus of claim 4, wherein said voltage limiting means comprises a Zener diode.

7. The apparatus of claim 3, wherein said third means includes current amplifier means connecting said one end of said capacitative component to said first means, said current amplifier means reducing the current drain from said capacitative component on triggering of any of said bistable devices.

8. The apparatus of claim 7, wherein said current amplifier means includes an active device having a base, an emitter and a collector, a collector circuit connecting said collector to one end of said second means, a base circuit connecting said base to said one end of said capacitative component, and an emitter circuit connecting said emitter to the other end of said capacitative component, said emitter circuit including a fourth resistive component connected between said first means and said other end of said capacitative component and across which said control voltage appears.

9. The apparatus of claim 1, wherein said circuitry includes a fifth resistive component and a switch connected across said fifth resistive component, said switch having one state in which said switch shunts said fifth resistive component and no voltage appears thereacross when any of said bistable devices is triggered to a conductive state and another state in which said switch does not shunt said fifth resistive component and a voltage appears thereacross when any of said bistable devices is triggered to a conductive state, said apparatus including means responsive to a voltage appearing across said fifth resistive component to shunt said second means and thereby interrupt the increase of said control voltage produced by said second means.

10. The apparatus of claim 3, wherein said circuitry includes a fifth resistive component and a switch connected across said fifth resistive component, said switch having one state in which said switch shunts said fifth resistive component and no voltage appears thereacross when any of said bistable devices is triggered to a conductive state and another state in which said switch does not shunt said fifth resistive component and a voltage appears thereacross when any of said bistable devices is triggered to a conductive state, said apparatus including means responsive to a voltage appearing across said fifth resistive component to shunt said second means and thereby interrupt the increase of said control voltage produced by said second means.

11. The apparatus of claim 9, wherein said means responsive to a voltage appearing across said fifth resistive component comprises a controlled rectifier having an output circuit comprising an anode and a cathode and having a second control electrode, circuit means connecting said anode and cathode elements across said second means, and a second control circuit connected at one end to said second control electrode and responsive to voltage appearing across said fifth resistive component to generate a pulse to said second control electrode to trigger said controlled rectifier to a conductive state.

12. The apparatus of claim 11, wherein said circuitry includes manually operated switch means having one position to interrupt said series connection between said source and said second means to thereby interrupt current flow through said output circuit of said controlled rectifier, said manually operated switch means having another position to restore the series connection between said source and said second means to thereby resume the increase of said control voltage produced by said second means.

13. Apparatus for sequentially activating a plurality of load devices comprising: a plurality of switchable devices each having an output circuit switchable from a nonconductive to a conductive state and a voltage responsive control electrode, a source of potential, circuitry to connect the output circuit of each swithcable device in series with said source and a corresponding one of said load devices, there being one switchable device for each load device, a plurality of control circuits, there being one control circuit for each switchable device connected at one end to the control electrode for said each switchable device, each said control circuit including a first resistive component establishing the magnitude of voltage required to trigger said switchable device to a conductive state, said voltage magnitude being different for each said control circuit, first means connecting the other ends of said control circuits in common, second means connected with said source to produce a control voltage which increases in magnitude with time, and third means connected between said second means and said first means to apply said control voltage to said first means.

14. Apparatus for sequentially activating a plurality of load devices, comprising: a plurality of switchable devices each having an output circuit and a control electrode, terminals for attachment to a source of potential, circuitry to connect the output circuit of each switchable device in series with said terminals and a corresponding one of said load devices, a plurality of control circuits, there being one control circuit connected to the control electrode for each switchable device, means connected to all of said control circuits providing a common input to said control circuits, means to produce a control voltage on said common input which increases in magnitude with time, each said control circuit including means establishing a magnitude of voltage required at said common input to switch the switchable device connected thereto, said voltage magnitude being different for each said control circuit.

References Cited

UNITED STATES PATENTS 3,258,613 6/1966 Felcheck et al. ----- 307—41 X

ROBERT K. SCHAEFER, Primary Examiner

H. J. HOHAUSER, Assistant Examiner

U.S. Cl. X.R.

328—75, 106